March 7, 1933.  A. KREMMLING  1,900,607
MACHINE FOR FEEDING PLASTIC MATERIAL SUCH AS
DOUGH THROUGH DIES OR LIKE APERTURES
Filed Nov. 19, 1932  2 Sheets-Sheet 1
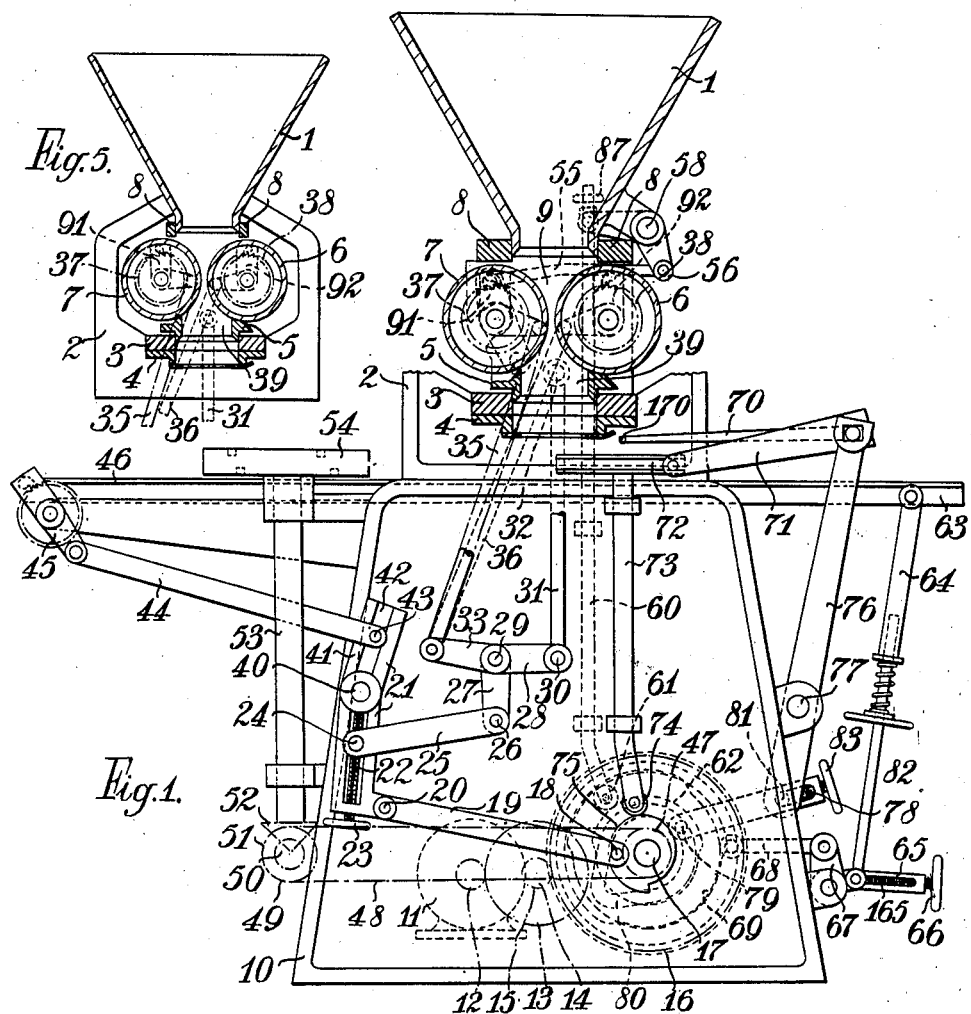
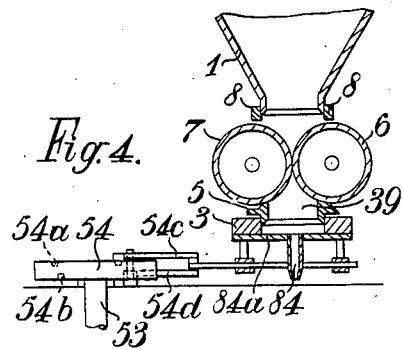
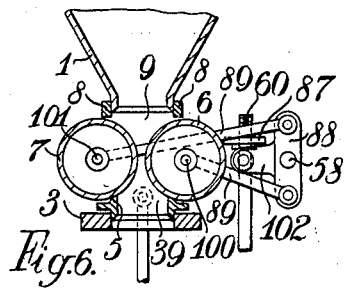

March 7, 1933.    A. KREMMLING    1,900,607
MACHINE FOR FEEDING PLASTIC MATERIAL SUCH AS
DOUGH THROUGH DIES OR LIKE APERTURES
Filed Nov. 19, 1932    2 Sheets-Sheet 2

A. Kremmling
INVENTOR

By Marks & Clark
ATTYS.

Patented Mar. 7, 1933

1,900,607

UNITED STATES PATENT OFFICE

ARIBERT KREMMLING, OF HAMERSLEBEN, NEAR OSCHERSLEBEN, GERMANY

MACHINE FOR FEEDING PLASTIC MATERIAL SUCH AS DOUGH THROUGH DIES OR LIKE APERTURES

Application filed November 19, 1932, Serial No. 643,486, and in Germany May 11, 1931.

This invention relates to machines for feeding plastic material, such as dough, sugar confections, marshmallow, nougat, chocolate or the like (hereinafter referred to as "dough"), through die apertures, whereby the dough is extruded and moulded to the desired shape or is extruded to a predetermined amount which is then cut off and subsequently moulded or manipulated in the de10 sired manner.

The invention has particular reference to machines of the type in which the dough is fed from a hopper or supply by a pair of cooperating feed rolls and an aim of the inven15 tion is to provide an improved machine, whereby the dough is gently handled and unnecessary and objectionable working of the dough is avoided.

The apparatus according to the present invention, comprises a hopper or supply an extrusion chamber terminating in a die aperture or apertures, feeding rolls for feeding material from the hopper to the extrusion chamber, and a conduit element intermediate the hopper and extrusion chamber and mounted for relative movement thereto, the feed rolls being supported by the conduit element and moving therewith.

Movement of the conduit element towards the extrusion chamber causes extrusion of material through the die or dies.

The feed rolls may be arranged at a fixed distance from one another or one may be movable toward or away from the other. Alternately, both rolls may be mounted to move toward or away from each other.

During extrusion the rolls may cut off the supply from the hopper.

The rolls may be rotated during the extru40 sion period or may be stationary.

Further features of the invention will be hereinafter described and defined by the claims.

In the accompanying drawings which illustrate a number of examples of machines according to the invention:—

Figure 1 is a side elevation partly in section of a machine in which one feed roll is movable toward or away from the other.

Figure 4 shows the upper part of the machine arranged as a depositor, certain parts being omitted.

Figure 5 diagrammatically illustrates the upper part of a modified form of the machine in which the axes of the feed rolls are fixed relatively to one another.

Figure 6 is a sectional elevation of the upper part of a modified form of the machine in which both feed rolls are movable towards and away from each other.

Figure 2:
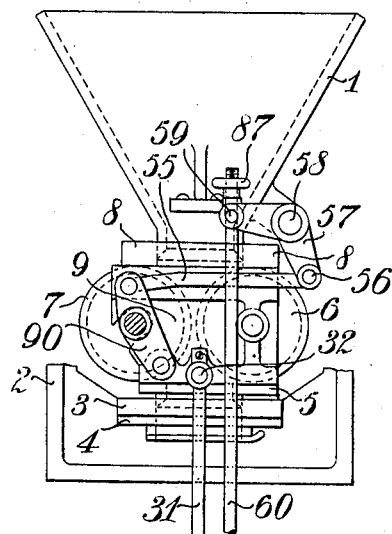
Figure 2 is an outside view of the rolls and conduit element and associated parts.
Figure 3:
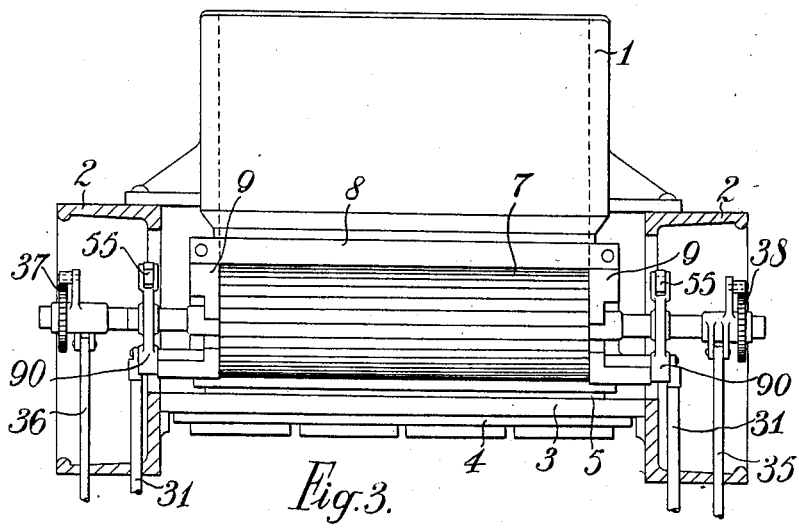
Figure 3 is an end view of the upper part of the machine.

In carrying the invention into effect according to one convenient mode, as applied to a wire cut machine, see Figures 1 to 3, a supply hopper 1 is rigidly mounted upon brackets 2 carried by the side frames 10 of the machine. The brackets 2 also support an element 3 which forms the lower walls of an extrusion or pressure chamber and beneath which a die plate 4 is fixed.

Between the mouth of the hopper 1 and the part 3 a conduit element is provided into the upper part of which the hopper telescopes, while the lower part of the conduit telescopes in the part 3 of the extrusion chamber. The conduit element is adapted to be moved vertically up and down between the hopper 1 and part 3 and carries a pair of feed rolls 6 and 7.

The conduit element is formed by a bottom piece or frame 5, end plates 9 and upper side bars 8. The frame 5 engages in the aperture in the part 3 and has upwardly extending side flanges which engage the feed rolls. The end plates 9 are fastened to the frame 5 and contact with the ends of the feed rolls 6 and 7. The end plates are provided with upper extensions engaging the outer surface of the ends of the hopper mouth, the sides of which contact with the bars 8 which are fastened to the end plates and engage the upper parts of the feed rolls.

It will be appreciated that the upper extensions of the end plates together with the bars 8 form a frame surrounding the mouth of the hopper.

The feed roll 6 is mounted in bearings or bosses in the end plates 9, while the feed roll 7 is carried by links 90 pivotally mounted on the plates so that it may be moved toward and from the feed roll 6, the plates 9 being slotted for this purpose as shown in Figure 2.

A main driving shaft 17 is provided which is driven by a motor 11 through gearing 12, 13, shaft 14 and gearing 15, 16. The shaft 17 carries a crank disc having a crank pin 18 which is connected by a coupling rod 19 with a slotted lever 21 by a pin 20. A nut provided with a pin 24 is adapted to be adjusted in the slot 22 of the lever 21 by means of a hand wheel 23.

The pin 24 forms a connection for a link 25 which at 26 is pivotally connected to an arm 27 rigid with a rock shaft 29. The rock shaft at its ends has rigidly fixed thereto arms 28 which are connected at 30 to links 31 the upper ends of which are pivotally connected to the end plates 9. By such arrangement, on rotation of the crank pin 18 the lever 21 is oscillated and imparts movement to the rock shaft 29 and consequent vertical reciprocations to the conduit element through the links 31.

The rock shaft 29 also carries arms 33 one of which is connected by a link 35 to a bell crank lever 91 pivoted on the trunnion of the feed roll 7. This bell crank lever 91 carries a spring pressed pawl engaging a ratchet wheel 37 on the trunnion of the feed roll, whereby an intermittent rotary drive is imparted to the roll.

Similarly the other arm 33 is connected by a link 36 to a bell crank 38 having a pawl engaging a ratchet wheel 92 on the trunnion of the feed roll 6, whereby the latter is intermittently rotated. The feed rolls are rotated inwardly towards each other to feed dough from the hopper 1 into the extrusion or pressure chamber 39.

On the rock shaft 40 which carries the slotted lever 21, another slotted lever 41 is mounted in the slot 42 of which a block carrying a pin 43 is adjustably mounted. The pin 43 is connected to one end of a link 44 the other end of which is coupled to a pawl lever 45 of a ratchet gear by which intermittent travel is imparted to a conveying device mounted on the table 63.

On the main driving shaft 17 there is a chain wheel 47 which drives a chain wheel 49 by the chain 48. The chain wheel 49 is fixed to a shaft 50 which by means of bevel gear 51, 52 drives a vertical shaft 53 carrying a cam disc 54.

Referring to Figure 2, the links 90 which carry the feed roll 7 are connected by links 55 at 56 to an arm 57 of a bell crank lever pivoted on a rock shaft 58 carried by the hopper 1. The other arm of the bell crank is connected to a rod 60 by an adjustable nut 59 thereon, the position of the nut on the rod being controlled by a hand wheel 87.

The rod 60 is guided and at its lower end is provided with a roll 61 engaging a cam groove 62 of a disc mounted upon the main driving shaft 17.

As the rod 60 is moved up and down the rock shaft 58 is oscillated and the feed roll 7 moved away from or towards the roll 6, the extent of relative movement being controlled by the hand wheel 87.

The table 63 is adapted to be pivoted up and down by an adjustable connecting rod 64, the lower end of which is adjustably mounted in the slot 165 of one arm 65 of a bell crank lever the other arm 67 of which is connected to a rod 68 operated by a cam 69 on the main shaft 17. Adjustment of the connection between the connecting rod 64 and the arm 65 is controlled by the hand wheel 66.

The machine is provided with a wire cutting device comprising a pair of fingers 70 between the ends of which a wire 170 is stretched. The fingers are rigidly connected to an arm 71 and pivotally carried by lever 76. The arm 71 is provided with a roller engaging in a guide 72 mounted upon a rod 73, the lower end of which carries a roller 74 engaging a cam 75 on the shaft 17.

Reciprocatory movement to the cutting wire 170 is imparted by the lever 76 which is pivoted at 77 and is coupled to a slotted lever 78. The lever 78 is provided with a roller 79 engaging the cam 80 on the main shaft 17. Adjustment of the lever 76 in the slot 82 is effected by the hand wheel 83.

By means of the cam controlled guides 72 upon termination of the cutting operation, the cutting wire is lowered in order that the severed piece may be correctly set or deposited on the receiving surface.

In operation during the upward movement of the conduit element, the dough is fed by the feed rollers 6 and 7 from the hopper in the extrusion chamber 39.

The feeding action of the rolls is assisted in that the dough in the hopper during such upward movement is pressed onto the surfaces of the rolls so that a good gripping action is obtained.

During the downward movement of the conduit element the capacity of the extrusion chamber is decreased so that a predetermined quantity of dough is forced through the apertures in the die plate.

The apparatus may be operated as a wire cut goods machine, or as a depositing machine, or for the delivery of pieces of predetermined size irrespective of their shape which divided pieces may be subsequently moulded or treated as desired. When used as a dividing machine the receiving table may be lifted towards the dies so that the extruded pieces will contact with the receiving surface before severance. On the table being lowered, the extruded pieces will be severed and will adhere more or less to the receiving surface (plate or conveyor band) by which they may be delivered to known means for further treatment, such as moulding.

When the apparatus is to be used as a depositing machine, the wire cutting device 70, 170 is put out of action, and the die plate 4 is replaced by nozzles 84 (see Figure 4). The nozzles may remain stationary or may be movable. Thus if the shaping of the deposited goods is to be effected by the nozzles, the nozzle plate 84a carrying the nozzles has controlled movement imparted to it by the rotary cam plate 54 through the cams 54a, 54b and the linkage 54c, 54d in known manner.

With the form of apparatus described with reference to Figure 1 the feed roll 7 during extrusion, that is, during the downward movement of the conduit element, is moved towards or into contact with the feed roll 6. At the same time no rotary motion is imparted to the rolls.

The distance between the surfaces of the feed rolls may be controlled by an adjustable stop lying in the path of the lever arm 57 and by adjustment of the hand wheel 87.

Springs may be provided tending to move the feed rolls apart.

According to the modified form illustrated in Figure 5, the feed rolls are maintained at a set distance apart. In such case, the rolls may be rotated during the downward or extrusion stroke of the conduit element as well as during the upward stroke. Such rotation may be over the whole or only a part of the upward and downward stroke.

In the construction illustrated in Figure 6 the feed rolls 6 and 7 are mounted in the conduit element so that they are both movable toward or away from each other. Thus the trunnion 100, 101 of the rolls 6 and 7 may be carried in links pivoted to the end plates 9 of the conduit element. The trunnions are also connected by links 89 to a lever 88 pivoted on the shaft 58, which also carries an arm 102 connected to a cam controlled rod 60 by an adjustable nut device 87. When the rod 60 is moved upwardly the feed rolls are moved inwardly towards one another while on downward movement of the rod the rolls are moved away from one another. The shaft 58 may be carried by a bracket from the hopper.

It will be appreciated that during the operation of the machine the rotary movement of the feed rolls and the vertical reciprocation of the conduit element are controlled and may be regulated from the hand wheel 23.

Having now described my invention, what I claim as new and desire to secure by Letters Patent is:—

1. Machine for feeding and depositing plastic material such as dough, comprising a supply hopper, an extrusion chamber terminating in a die aperture, a conduit element intermediate the hopper and extrusion chamber and mounted for movement relatively thereto, and feed rolls supported by the conduit element for feeding dough from the hopper to the extrusion chamber.

2. Machine for feeding and depositing plastic material such as dough comprising a supply hopper, an extrusion chamber terminating in a die aperture, a conduit element intermediate the hopper and extrusion chamber and mounted for movement relatively thereto, a pair of feed rolls supported by the conduit element, and means for varying the space between the rolls.

3. Machine for feeding and depositing plastic material, such as dough, comprising a supply hopper, an extrusion chamber terminating in a die aperture, a conduit element intermediate the hopper and extrusion chamber and movable relatively thereto, a pair of feed rolls supported by the conduit element and means for intermittently rotating the feed rolls.

4. Machine for feeding and depositing plastic material such as dough, comprising a supply hopper, an extrusion chamber terminating in a die aperture, a conduit element located between the hopper and extrusion chamber and movable relatively thereto, a pair of feed rolls supported by the conduit element, means for vertically reciprocating the conduit element and means for intermittently rotating the feed rolls, the arrangement being such that during an upward movement of the conduit element, a rotary feeding movement is imparted to the feed rolls.

5. Machine for feeding and depositing plastic material such as dough, as claimed in claim 4, wherein means are provided for moving the feed rolls toward one another, whereby during a downward movement of the conduit element the space between the feed rolls is reduced.

6. Machine for feeding and depositing plastic material such as dough comprising a supply hopper, an extrusion chamber terminating in a die aperture, a conduit element located between the hopper and extrusion chamber and providing communication therebetween, a pair of feed rolls supported by the conduit element and cam controlled means for imparting movement to the conduit element relatively to the hopper and extrusion chamber and for intermittently rotating the feed rolls.

7. Machine for feeding and depositing plastic materials such as dough, comprising a supply hopper terminating in a mouth, an extrusion chamber terminating in a die aperture, a conduit element located between the hopper and extrusion chamber, said hopper mouth telescoping into the conduit element at the upper end, the lower end of the conduit element telescoping into the extrusion chamber, a pair of feed rolls supported upon the conduit element, and means for imparting reciprocatory movement to the conduit element intermittently to reduce the capacity of the extrusion chamber to force dough through the die aperture.

In testimony whereof I have signed my name to this specification.

ARIBERT KREMMLING.